June 17, 1969 A. E. MANN 3,450,568

SOLAR CELL WITH WRAP-AROUND ELECTRODES

Filed April 28, 1966 Sheet 1 of 2

INVENTOR.
ALFRED E. MANN

BY

Elliott & Pastoriza
ATTORNEYS

INVENTOR.
ALFRED E. MANN
BY
Elliott & Pastoriza
ATTORNEYS

United States Patent Office 3,450,568
Patented June 17, 1969

3,450,568
SOLAR CELL WITH WRAP-AROUND ELECTRODES
Alfred E. Mann, Sylmar, Calif., assignor, by mesne assignments, to Textron Electronics, Inc., a corporation of Delaware
Filed Apr. 28, 1966, Ser. No. 545,931
Int. Cl. H01m *15/02*
U.S. Cl. 136—89 11 Claims

ABSTRACT OF THE DISCLOSURE

A substantially co-planar solar cell array includes solar cells each having first electrode means in ohmic contact with its top solar sensitive surface and second electrode means in ohmic contact with its bottom surface, the second electrode means extending around the cell to overlie a top portion of the cell without ohmic contact so as to be in electrically separated relationship to the first electrode means. By so providing rear or bottom electrodes which wrap around the cell to the top, both positive and negative connecting points of power take-off means can be effected on the top surface and thus will be clearly visible and accessible. The disclosure also contemplates unique interconnecting means for four adjacent corners of cells in an array to provide a proper series-parallel matrix with sufficient flexibility in the interconnections to accommodate thermal strains and other mechanical shocks which might otherwise damage the array.

This invention relates generally to solar cells and more particularly to a novel electrode configuration of a solar cell for use in solar cell arrays.

In U.S. Patent No. Re. 25,647 and U.S. Patent No. 3,340,096 and in co-pending patent applications, Ser. Nos. 450,597 and 562,791, filed, respectively, on Apr. 26, 1965 and July 5, 1966, there are described solar cell arrays with interconnections in the form of stress relief strips and tabs enabling the cells to be disposed in a substantially co-planar series-parallel matrix.

In the latter mentioned co-pending application, Ser. No. 562,791 filed July 5, 1966, the solar cell is constructed such that the top electrode wraps about an edge of the cell to overlap a portion of the bottom surface of the cell, the bottom electrode in turn covering a major portion of the bottom surface but electrically separated from the overlapping portion of the first electrode. With such an arrangement, solar cells may be packed in a co-planar array in a fairly dense manner since it is not necessary to pass interconnecting means between adjacent cells defining the series-parallel matrix. In addition, by having all of the contacts on the bottom surface of the cell, there is provided the obvious advantage of maximizing the solar sensitive top area of the cell.

On the other hand, with the foregoing configuration, the contacts are on the bottom of the cell and are thus inaccessible for easy inspection and repair. While the array may be initially manufactured on a separate sheet and the various connections inspected prior to mounting the same onto a suitable basic substrate, it would be more desirable to enable an inspection of the contacts after the cells have been mounted on the substrate. This is because in the actual mounting on the substrate, some of the interconnections may be damaged, and since they are not visible after mounting on the substrate, such damage could not readily be detected.

In addition to the foregoing, in the maintenance and repair of solar cell arrays, it is difficult to insure circuit integrity after such repair if the interconnections between the cells are not visible.

With the foregoing considerations in mind, it is a primary object of the present invention to provide an improved electrode configuration for solar cells in which the various interconnections between the cells defining the series-parallel matrix are at all times visible, even after the cells have been mounted on a suitable basic substrate, all to the end that inspections and repairs may readily be carried out and the integrity of the circuit determined by visual inspection.

More particularly, it is an object to provide an improved electrode configuration for solar cells employed in an array wherein the advantages of close packing in a substantially co-planar configuration as outlined in the immediately preceding referred to co-pending application are fully realized.

Another important object is to provide a novel electrode configuration for solar cells in an array wherein interconnections between the cells are clearly visible and in which such interconnections incorporate suitable stress relief means so that all of the advantages of increased reliability as a consequence of non-rigid interconnections between the cells are realized.

Briefly, these and other objects and advantages of this invention are attained, in one embodiment, by providing each of the various solar cells making up a substantially co-planar array with a first electrode means including the usual current pick-up grid paths on the top surface of the cell. These grid paths are joined adjacent to one edge of the cell in a common path which may extend along an edge, top marginal surface of the edge, or bottom marginal surface of the edge of the cell. In all configurations, the common path is joined to top surface portions adjacent to the corners defining the ends of the edge of the cell. A second electrode means disposed on the bottom portion of the cell, in turn, is extended or wrapped about another edge or edges of the cell to cover a top portion of the cell. Preferably, this top portion, which is electrically separated, is at the end corners of an opposite edge, in spaced relation to the current pick-up portions of the first electrode means so that the connecting points of adjacent cells and ultimately of the power take-off means for the cells can be effected on the top surface of the various cells and thereby be clearly visible for inspection.

With respect to the foregoing, there is also provided a novel interconnecting means in the form of a flexible member having curled tabs adapted to engage the top surface portions of four adjacent corners in a set of four cells defined by two successive cells in adjacent columns of the array. Thus, four cells are interconnected in a series-parallel matrix by a single interconnecting member. By placing such connectors on each corner, redundancy is provided to increase reliability, and by providing a plurality of such interconnecting members for various sets of four cells, an array of desired size is provided.

A better understanding of the invention will be had by now referring to the accompanying drawings, in which.

Figure 1:
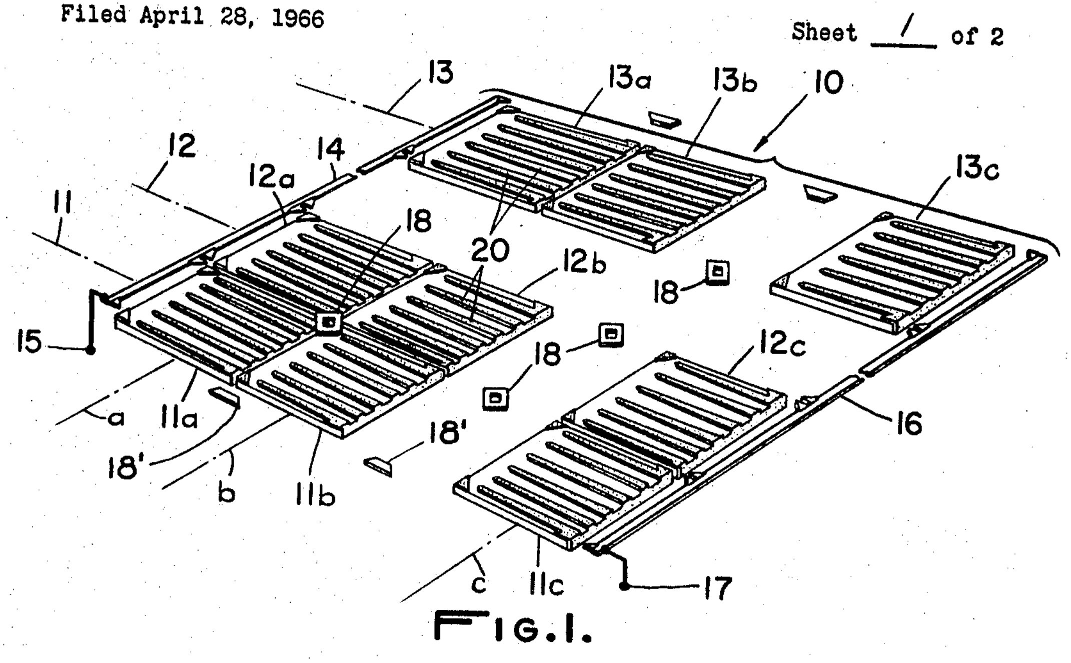
FIGURE 1 is a perspective view, partially exploded, of a solar cell array made up of solar cells having the improved electrode configuration and interconnecting means of this invention.

Referring first to FIGURE 1, there is illustrated a solar cell array including a plurality of solar cells in end-to-end relationship to define columns of cells such as indicated by the dashed lines at 11, 12, and 13. The various cells in the columns are in side-by-side relationship to define rows of cells indicated by the dashed lines *a*, *b*, and *c*. The cells themselves making up the columns and rows are shown at 11*a*, 11*b*, and 11*c*, for the column 11; 12*a*, 12*b*, and 12*c* for the column 12; and 13*a*, 13*b*, and 13*c* for the column 13. With this designation, it will be clear that the cells 11*a*, 12*a*, and 13*a* make up the first row; the cells 11*b*, 12*b*, and 13*b* make up the second row; and the cells 11*c*, 12*c*, and 13*c* make up the third row. It will be understood that many more or fewer cells may be included in each column and row than are shown.

As will become clearer in a later portion of the description, each of the solar cells in the embodiment disclosed is provided with first electrode means including current pick-up grid paths merging into a transverse path extending to the corners of one edge of the cell. A second electrode means on the bottom portion of the cell, in turn, is wrapped around an opposite edge of the cell to terminate adjacent top surface portions on the corners defining the ends of the opposite edge. With this arrangement, the electrodes include connection points all on the top surface of the cell. As shown in FIGURE 1, a common conducting strip or bar 14 connects by means of suitable tabs to the wrapped around portions of the bottom electrodes of the cells in the first row "*a*" so that the strip extends adjacent to the top surface of the cells and terminates at a power take-off point 15. The other power take-off for the array is provided by an elongated strip or connecting bar 16 having suitable tabs connecting to a terminal 17 and to the top corner portions of the first electrodes in the last row "*c*." Such terminal connection strips may be similar to those described in Patent Re. 25,647.

The interconnections between the various cells within the series-parallel matrix are preferably achieved by a plurality of interconnecting members 18, each such member being associated with the adjacent corners of four cells. Thus, for example, one of the interconnecting members 18 connects the adjacent corners of four cells in a set defined by successive cells in adjacent columns 11 and 12, these cells being designated 11*a* and 11*b* in the first column and 12*a* and 12*b* in the second column. Also half sizes interconnecting members or tabs such as shown at 18' are provided to connect the two adjacent corners at the outside edges of the cells in the first and last columns 11 and 13.

In FIGURE 1, the exploded portions are provided to render clear that many more cells may be included in the various columns and rows.

Figures 2, 3, 4:
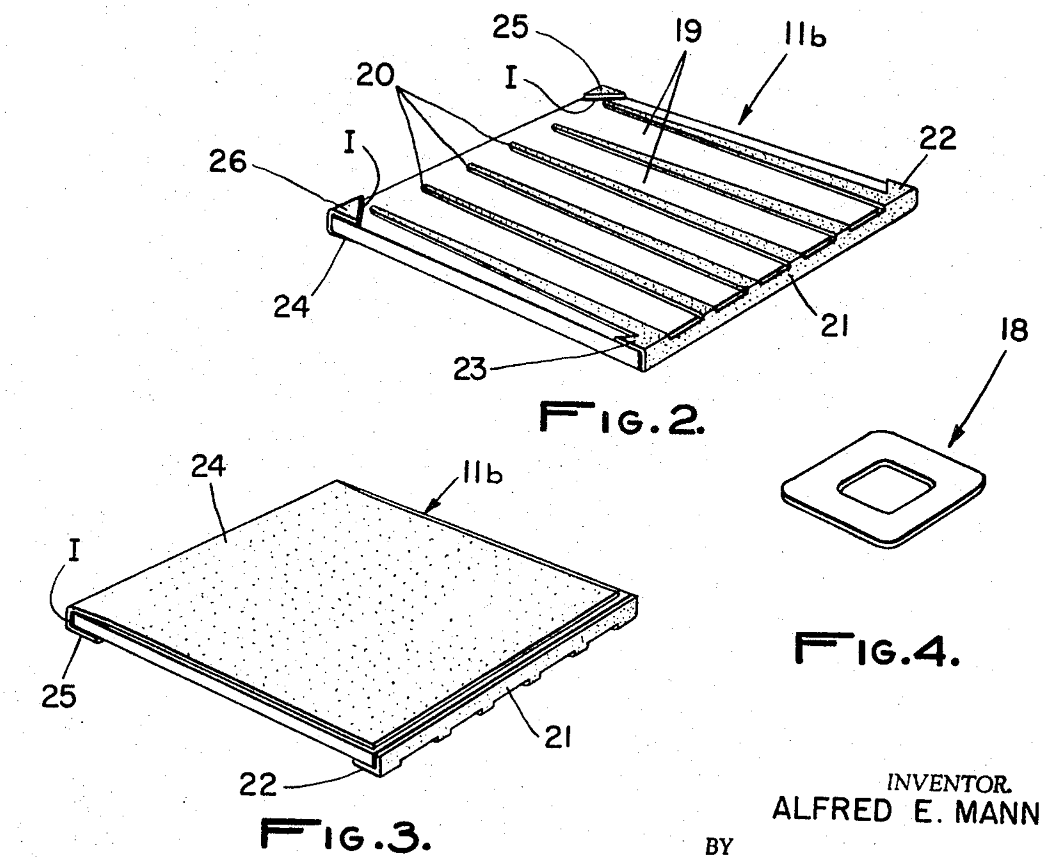
FIGURE 2 is an enlarged perspective view of one of the cells in FIGURE 1 showing the top surface thereof.
FIGURE 3 is a perspective view of the bottom surface of the cell shown in FIGURE 2.
FIGURE 4 is a perspective view of one type of interconnecting member employed in the array illustrated in FIGURE 1.

With reference now to FIGURES 2 and 3, the cell 11*b*, which is typical of the other cells, is shown in greater detail wherein the configuration of the electrodes will be clear. As shown, the cell includes a top solar sensitive surface 19 which may comprise a thin semi-conductor layer having one polarity deposited, fused, grown, or otherwise formed on a semi-conductor layer or wafer of opposite polarity. A plurality of current pick-up paths 20 constituting part of a first electrode means are formed on the top surface 19 and, in the embodiment shown in FIGURES 2 and 3, merge into a common path 21 along one edge of the cell. As shown, this electrode extends to top surface portions of the corners of this edge as indicated at 22 and 23. Care is taken to minimize the degree of obscuring of the top solar sensitive surface of the cell and yet provide a sufficient area such as, for example, the triangular corner area shown to enable a proper connection of the interconnecting means for effecting the series-parallel matrix in the cell array. In FIGURE 2, the widths and heights of the paths 20 are greatly exaggerated for purposes of clarity.

The second electrode means on the bottom of the cell is shown at 24 and extends over a major portion of the bottom surface and thence wraps around the opposite edge adjacent the corners thereof to terminate in positions overlying top surface portions of these corners as at 25 and 26. It will be noted that the top surface portions 25 and 26 are in spaced relationship from the surface layer 19 to assure an electrical separation from this layer and the various conductive current paths 20 and connection points 22 and 23 making up the first electrode means so that these electrodes are properly electrically separated from each other although both appear on the top surface. The electrical separation from the surface layer 19 can be provided by suitable insulation as shown at I or preferably by eliminating any of the surface layer 19 at the corner areas over-lapped by the connection points 25 and 26.

By providing corner terminal points for the electrodes as described, a novel interconnecting means for the cells can be provided in the form of the interconnecting member 18 shown in FIGURE 1 wherein four adjacent corners of a set of four cells are engaged simultaneously. Thus, as described with reference to FIGURE 1, it will be evident that the interconnecting member 18 for the cells 11*a*, 11*b*, 12*a* and 12*b* serves to connect the first electrodes of the cells 11*a* and 12*a* in parallel with each other and in series with the second electrodes of the cells 11*b* and 12*b*, the same interconnecting member also connecting these second electrodes in parallel with each other. The tabs 18' function to connect the outer corners of the cells in the outer columns as described. Thus, there is provided the desired redundancy in the connections of the cells in the array; and, moreover and more importantly, all of the various connections between the cells are clearly visible even after the cells have been assembled on a basic substrate.

FIGURE 4 illustrates in greater detail, the interconnecting member 18 wherein a simple ring type configuration is provided with a central opening to permit inspection and also render it flexible to accommodate any relative shifting between the cells.

Figure 5:
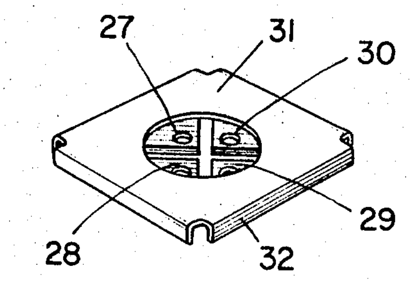
FIGURES 5 and 6 are perspective views of modified types of interconnecting members.

FIGURE 5 shows in greater detail a second type of interconnecting member wherein the structure comprises a flexible integral conducting member having four curled under tabs 27, 28, 29, and 30. The top portion 31 of the member is in a plane raised slightly above the plane of the ends of the curled under tabs to define curved surface portions 32 at the sides of the structure. The curved portions provide flexibility and thus stress relief to accommodate any slight shifting between the various cells as a consequence of vibration or thermal expansion and contraction.

Figure 6:
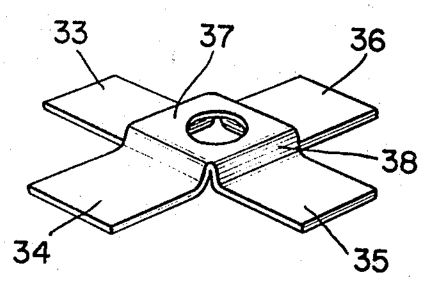

In FIGURE 6, there is shown a modified interconnecting means wherein a conductor member includes four extending tabs 33, 34, 35, and 36. In the illustration shown, the top surface 37 of the member is raised slightly above the plane of the tabs to define a curved surface portion such as at 38 at the junction of the various tabs with the central member. This curved portion provides additional flexibility and stress relief similar to the connector shown in FIGURE 4.

Figures 7, 8, 9:
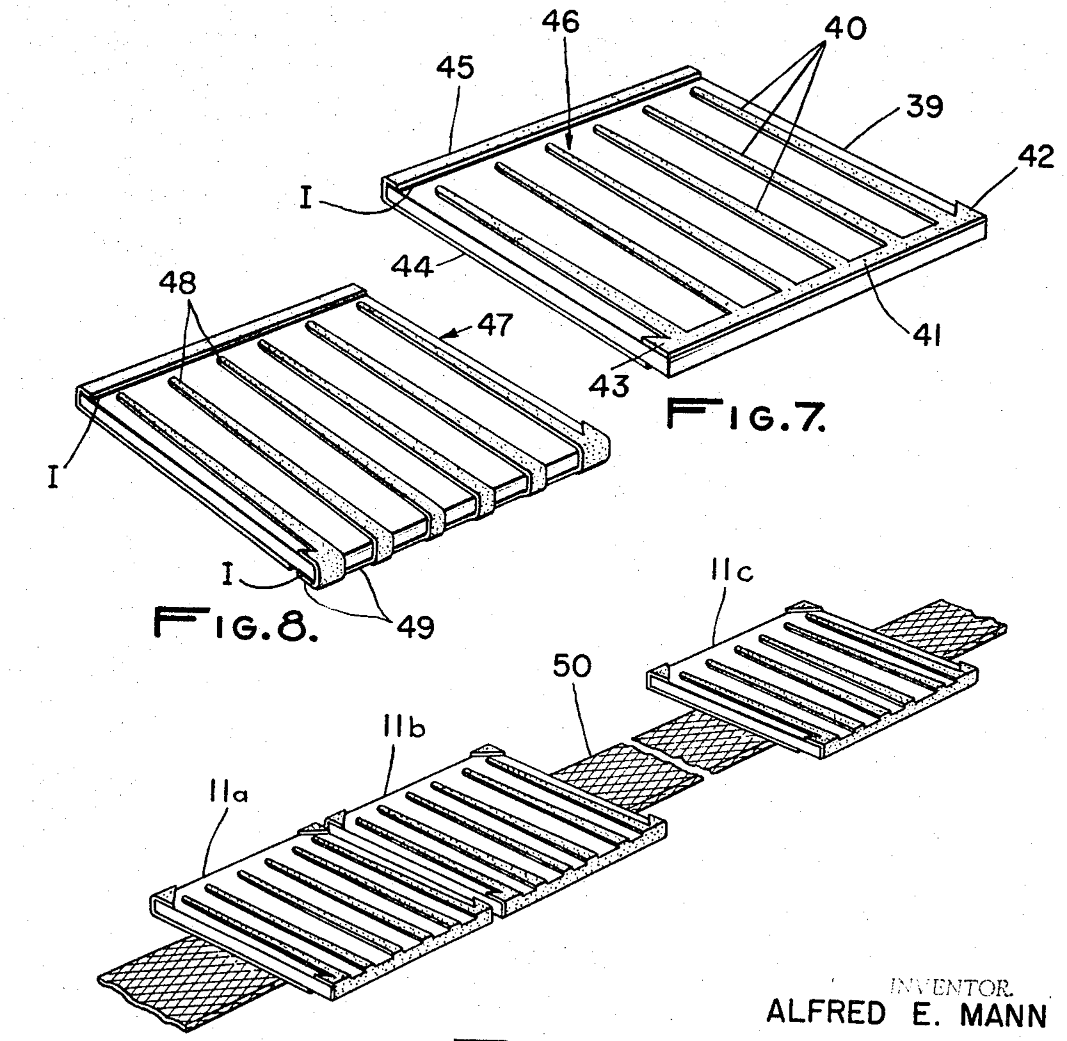
FIGURE 7 is a top perspective view of a modified electrode configuration.
FIGURE 8 is a bottom perspective view of still another type of electrode configuration.
FIGURE 9 illustrates a connecting strip which may be employed with rows of cells such as shown in FIGURE 1.

FIGURE 7 illustrates a solar cell 39 which is the same as the cell illustrated in FIGURE 2 but has modified first and second electrode means. As shown, the first electrode means include current pick-up paths 40 similar to the pick-up paths 20 on the cell of FIGURE 2. These paths 40 merge into a common path 41 along the top marginal surface rather than the edge as in FIGURE 2.

The electrode path terminates at the corners as at 42 and 43.

The second electrode means is shown at 44 and covers the rear surface of the cell in the same manner as the electrode 24 of FIGURE 3, but rather than merely wrapping around the corner portions, the electrode 44 is wrapped about the side of the cell at 45 to terminate in a position electrically separated from the remaining top surface 46. While the whole marginal top edge of the cell is overlapped, the wrapped around portion could extend to overlap only portions of the marginal edge if desired.

FIGURE 8 illustrates a cell 47 similar to FIGURE 7 but in which the grid paths 48 merge into a common path 49 along the bottom marginal edge surface of the cell rather than the edge as in FIGURE 2, or the top marginal surface as in FIGURE 7.

Referring now to FIGURE 9, there is shown the row of cells 11*a*, 12*a* and 13 wherein an underlying strip or wire mesh 50 may be provided connecting all of the bottom electrodes in the row together. By this arrangement, there is provided further redundancy in the bottom electrode connections to those provided by the interconnecting structures shown in FIGURES 4, 5, and 6. In adition, the strip 50 serves to increase reliability by providing electrical integrity at least with portions of the second electrode means of adjacent cells in the event a cell is fractured or in the event one or more connections with adjacent cells are lost.

While it is evident from the above-described electrode configurations that the top solar sensitive surface of the cells will in part be obscured by the use of the top electrode connections, this disadvantage is more than offset by the convenience in assembly and manufacture and the ability to carry out visual inspections of the integrity of the circuits.

From the foregoing description, it will accordingly be evident that the present invention has provided a greatly improved solar cell electrode configuration for use in solar cell arrays wherein the various objects set forth heretofore are fully realized. Other configurations within the scope and spirit of the teachings herein will occur to those skilled in the art. The invention is therefore not to be thought of as limited to the particular embodiments set forth.

What is claimed is:

1. A solar cell having a first electrode means in ohmic contact with a top surface portion of said cell; a second electrode means in ohmic contact with a bottom surface portion of said cell and extending around said cell to overlie another top surface portion of said cell without ohmic contact with said another top surface portion and in spaced relationship to said first electrode means, the top surface of said cell constituting the photo-sensitive surface thereof exposed to solar radiation, whereby both positive and negative connecting points of power take-off means for said cell can be effected on said top surface of said cell and thereby be clearly visible and accessible.

2. A cell according to claim 2, in which said first electrode means includes a plurality of current pick-up path on said top surface of said cell merging into a path running along said top surface close to one edge and in which said second electrode means wraps about a portion of the edge of said cell opposite said one edge to overlie a top surface portion adjacent to at least a part of said edge opposite said one edge.

3. A cell according to claim 2, in which said first electrode means extends to at least one corner of one edge of the top surface of said cell.

4. A cell according to claim 2, in which said first electrode means includes a plurality of current pick-up paths on the top surface of said cell merging into a path adjacent to an edge of said cell, said path terminating at the corners of said edge and in which said second electrode means wraps about at least another edge portion of said cell to overlie at least one of the remaining corners of said cell.

5. A solar cell array comprising columns and rows of cells, each cell having a top solar sensitive surface constituting the photo-sensitive surface exposed to solar radiation; a first electrode means in ohmic contact with said top solar sensitive surface; a second electrode means extending from the bottom of said cell and passing about said cell to overlie a top surface portion of said cell in electrically separated relationship thereto; and interconnecting means for electrically connecting said first and second electrode means of the several cells to define a series-parallel matrix whereby both positive and negative connections are on the top surfaces of said cells.

6. A solar cell array according to claim 5, including at least one elongated flexible conducting strip means running beneath the bottom surfaces of the cells in said rows of cells and electrically connected to the second electrode means on said cells.

7. A solar cell array according to claim 5, in which said first electrode means on each cell includes a plurality of current paths extending from a common path adjacent to one edge of said top solar sensitive surface towards the opposite edge, said common path extending to the top surface portions of the corners of said one edge, said second electrode means extending and passing about at least another edge portion to terminate at the top surface portions of the corners of said opposite edge, and interconnecting means electrically connecting the top surface portions of the four adjacent corners of each set of four cells in said array defined by two successive cells in adjacent columns.

8. A solar cell array according to claim 7, in which each of said interconnecting means comprises a ring shaped conducting member.

9. A solar cell array according to claim 7, in which each of said interconnecting means comprises an integral flexible conducting member having four curled under tabs, the central portion of said member being raised above the plane of the under-lying tabs to define stress relief curves at the junction of each tab with said central portion, said tabs being dimensioned to respectively engage said top surface portions of said four adjacent corners.

10. A solar cell array according to claim 7, in which each interconnecting means comprises an integral flexible conducting member having four laterally extending tabs to define a general X shape, said tabs being dimensioned to respectively engage said top surface portions of said four adjacent corners.

11. A solar cell array according to claim 10, in which the central portion of said member from which said tabs extend is raised to define stress relief curves at the junction of each tab with said central portion.

References Cited

UNITED STATES PATENTS

| | | | |
|---|---|---|---|
| 2,705,767 | 4/1955 | Hall | 136—89 |
| 2,854,552 | 9/1958 | Gouverneur | 339—19 |
| 3,208,028 | 9/1965 | Mittler et al. | 339—18 |
| 3,255,047 | 6/1966 | Escoffery | 136—89 |
| 3,359,137 | 12/1967 | Kaye et al. | 136—89 |
| 3,375,141 | 3/1968 | Julius | 136—89 |

WINSTON A. DOUGLAS, *Primary Examiner.*

M. J. ANDREWS, *Assistant Examiner.*